(12) United States Patent
Huang et al.

(10) Patent No.: US 8,242,757 B2
(45) Date of Patent: Aug. 14, 2012

(54) CONSTANT POWER CONTROL APPARATUS AND CONTROL METHOD THEREOF

(75) Inventors: Yao-Te Huang, Changhua County (TW); Ching-Ran Lee, Kinmen County (TW); Li-Ling Lee, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 523 days.

(21) Appl. No.: 12/535,741

(22) Filed: Aug. 5, 2009

(65) Prior Publication Data

US 2010/0277139 A1 Nov. 4, 2010

(30) Foreign Application Priority Data

Apr. 30, 2009 (TW) ................. 98114479 A

(51) Int. Cl.
*G05F 1/00* (2006.01)
*H02J 3/12* (2006.01)
*H05B 37/02* (2006.01)
*H05B 39/04* (2006.01)
*H05B 41/36* (2006.01)

(52) U.S. Cl. ...................... 323/246; 315/308
(58) Field of Classification Search .......... 315/224, 315/297, 307, 279, 308; 363/23; 323/234, 323/246
See application file for complete search history.

(56) References Cited

U.S. PATENT DOCUMENTS

| | | | |
|---|---|---|---|
| 4,639,848 A | 1/1987 | Sakai | |
| 5,731,665 A | 3/1998 | Pruett | |
| 6,075,326 A | 6/2000 | Nostwick | |
| 6,127,789 A | 10/2000 | Ishizuka et al. | |
| 6,515,882 B2 | 2/2003 | Moriguchi et al. | |
| 6,617,808 B2 | 9/2003 | Ito et al. | |
| 6,892,327 B2 | 5/2005 | Ko et al. | |
| 7,012,374 B2 | 3/2006 | Kurimoto et al. | |
| 7,199,528 B2 | 4/2007 | Quazi | |
| 7,317,286 B2 | 1/2008 | Nomizo | |
| 7,525,256 B2 | 4/2009 | Ribarich et al. | |

(Continued)

FOREIGN PATENT DOCUMENTS

TW M257075 2/2005

(Continued)

OTHER PUBLICATIONS

English language translation of abstract of TW M257075 (published Feb. 11, 2005).

(Continued)

*Primary Examiner* — Jue Zhang
(74) *Attorney, Agent, or Firm* — Thomas|Kayden

(57) ABSTRACT

A constant power control apparatus and a controlling method thereof are provided. The constant power control apparatus outputs output power to a load element. The constant power control apparatus includes a compensation and modification device, a constant power control device, and a power generation circuit. The compensation and modification device receives an expected output power voltage and a voltage feedback signal relating to the output power. The compensation and modification device transforms the expected output power voltage into a current reference value, and modifies the current reference value to generate a modified current reference value according to the voltage feedback signal. The constant power control device receives the modified current reference value and a current feedback signal relating to the output power, and generates a control signal for use in power modulation. The power generation circuit receives the control signal and outputs the output power.

21 Claims, 2 Drawing Sheets

U.S. PATENT DOCUMENTS

| | | | |
|---|---|---|---|
| 2003/0076053 A1* | 4/2003 | Kambara et al. | 315/308 |
| 2003/0160576 A1* | 8/2003 | Suzuki | 315/224 |
| 2003/0222627 A1* | 12/2003 | Hwang | 323/222 |
| 2003/0222633 A1* | 12/2003 | Hwang | 323/282 |

FOREIGN PATENT DOCUMENTS

| | | |
|---|---|---|
| TW | I260593 | 8/2006 |
| TW | 200636417 | 10/2006 |
| TW | 200626390 | 4/2009 |

OTHER PUBLICATIONS

English language translation of abstract of TW I260593 (published Aug. 21, 2006).

English language translation of abstract of TW 200636417 (published Oct. 16, 2006).

English language translation of abstract of TW 200626390 (published Apr. 1, 2009).

\* cited by examiner

CONSTANT POWER CONTROL APPARATUS AND CONTROL METHOD THEREOF

This application claims the benefit of Taiwan application Serial No. 98114479, filed Apr. 30, 2009, the subject matter of which is incorporated herein by reference.

TECHNICAL FIELD

The invention relates in general to constant power control apparatus and control method thereof, and more particularly to a constant power control apparatus and a control method thereof which utilize voltage and current feedback signals.

BACKGROUND

In the modern age, in which the technological development changes with each passing day, many innovative and practical electronic apparatuses or lighting apparatus are required. In this regard, power conversion circuits play an important role in, for example, the apparatuses applying power supplies such as computers, lighting lamps and so on. Conventional power conversion circuits can be implemented by three approaches, i.e., constant voltage control, constant current control, and constant power control. In the approach of constant voltage control, the output power is decreased as the output impedance increases. In the approach of constant current control, the output power is increased as the output impedance increases. If the output power is controlled by simply adopting the approach of constant voltage control or the constant current control, the cost is relatively low and the circuit design is relatively uncomplicated, but the power is easily varied and damages the elements.

The approach of constant power control can improve the problems caused by constant voltage and current control approaches, which controls the overall power generated at the load side. However, a conventional constant power control apparatus controls the output power by using high-cost multipliers or accumulators, so that the circuit complexity and the cost are increased. Taking microprocessors provided by a company of Micro Chip as an example, a chip without multiplier charges about 1 USD, while a chip with multiplier charges at least about 2.5 USD. As for a digital signal processor (DSP) provided by Texas Instruments (TI), its price is further about 8 USD or more. An integrated circuit (IC) of multiplier labeled with AD633 and provided by a company of Analog Devices, which is commonly used in the market, charges about 5 to 8 USD. As such, if a product applies these kinds of constant power control apparatus, its cost is increased greatly.

BRIEF SUMMARY

Embodiments of a constant power control apparatus and control method thereof are disclosed, in which the output power is adjusted with respect to a voltage feedback signal and a current feedback signal, thereby achieving the constant power output without using multipliers and accumulators. In addition, the apparatus can be implemented with analog or digital circuit design.

Embodiments of a constant power control apparatus are provided for providing output power to a load element. The constant power control apparatus comprising a compensation and modification device, a constant power control device, and a power generation circuit. The compensation and modification device is for receiving an expected output power voltage and a voltage feedback signal relating to the output power. The compensation and modification device transforms the expected output power voltage into a current reference value, and modifies the current reference value to generate a modified current reference value according to the voltage feedback signal. The constant power control device is for receiving the modified current reference value and a current feedback signal relating to the output power, and generating a control signal for adjusting the output power. The power generation circuit is for receiving the control signal and outputting the output power.

Embodiments of a constant power control method are provided for use in a constant power control device to provide output power to a load element. The constant power control method comprising the following steps. First, receive an expected output power voltage and transforming the expected output power voltage into a current reference value. Also, receive a voltage feedback signal relating to the output power, and modifying the current reference value to generate a modified current reference value according to the voltage feedback signal. Then, generate a control signal for adjusting the output power according to the modified current reference value and a current feedback signal relating to the output power. Following that, modulate the control signal so as to provide the output power.

It is to be understood that both the foregoing general description and the following detailed description are exemplary and explanatory only and are not restrictive of the disclosed embodiments, as claimed.

DETAILED DESCRIPTION OF THE APPLICATION

Exemplary embodiments provide a constant power control apparatus and a control method thereof, which detect the output power provided to the load element, feed back a voltage feedback signal and a current feedback signal which are relating to the output power, and adjust the output power accordingly. For example, the voltage feedback signal can be served as the adjustment basis for the constant power control apparatus, and the current feedback signal can be served as the reference value for the constant power control apparatus, so as to exactly control the output power. Alternately, the current feedback signal can be served as the adjustment basis for the constant power control apparatus, and the voltage feedback signal can be served as the reference value for the constant power control apparatus, so as to exactly control the output power.

Figure 1:
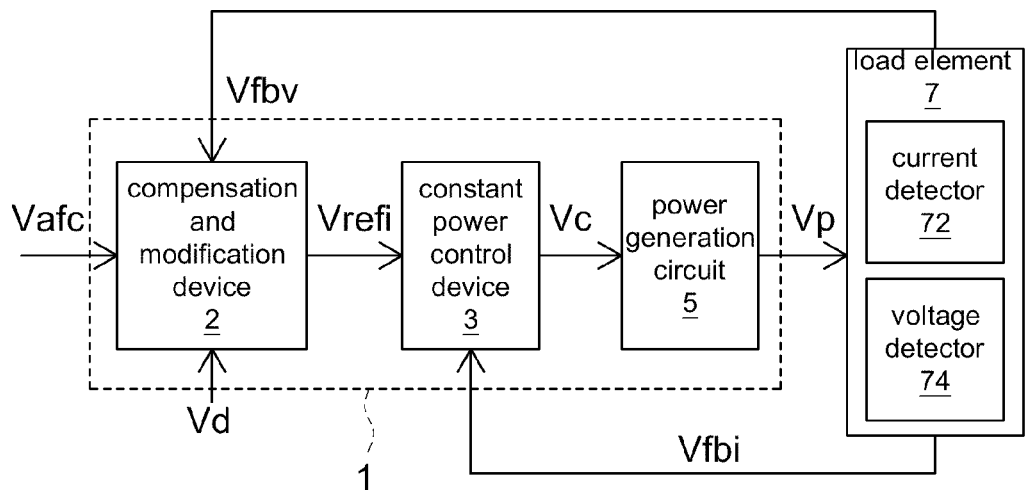
FIG. 1 is a block diagram showing a constant power control apparatus according to an exemplary embodiment.

FIG. 1 is a block diagram showing a constant power control apparatus according to an exemplary embodiment. The constant power control apparatus 1 can be applied to a load element 7 which requires constant power control. The constant power control apparatus 1 here can be, for example, applied to a dimmable electronic ballast for a metal halide lamp, wherein the load element 7 is regarded as the metal halide lamp. The constant power control apparatus 1 includes a compensation and modification device 2, a constant power control device 3, and a power generation circuit 5. The constant power control apparatus 1 receives an expected output power voltage Vafc provided by an external device, and transforms the expected output power voltage Vafc into a current reference value. The constant power control apparatus 1 further receives a voltage standard value Vd which is related to the characteristics of the load element 7, proceeds to power modulation control, and provides the output power Vp to the load element 7. The load element 7 can include a current detector 72 and a voltage detector 74. The current detector 72 and the voltage detector 74 detect a current feedback signal Vfbi and a voltage feedback signal Vfbv relating to the output power Vp, respectively.

For example, the current reference value can be obtained after the compensation and modification device 2 transforms the expected output power voltage Vafc. In other words, the current reference value can be determined according to the expected output power voltage Vafc. The output power Vp also can be determined according to the expected output power voltage Vafc, e.g., the capability of the output power Vp is determined according to the level of the expected output power voltage Vafc. If the expected output power voltage Vafc is constant, the constant power control apparatus 1 provides the output power Vp which is constant to the load element 7; and if the expected output power voltage Vafc is adjustable, the constant power control apparatus 1 provides the output power Vp which is adjustable to the load element 7.

In the constant power control apparatus 1, the compensation and modification device 2 receives: the voltage feedback signal Vfbv which is detected from the load element 7; the expected output power voltage Vafc which is provided by the external device; and the voltage standard value Vd which is provided according to the characteristic of the load element 7. The compensation and modification device 2 generates a modified current reference value Vrefi according to the voltage feedback signal Vfbv, the expected output power voltage Vafc, and the voltage standard value Vd. For example, the voltage feedback signal Vfbv relating to the load element 7 is useful in modifying the expected output power voltage Vafc provided by the external device, and thus to generate the modified current reference value Vrefi. The constant power control device 3 receives the modified current reference value Vrefi, which is outputted by the compensation and modification device 2, and generates a control signal Vc for adjusting the output power Vp according to the modified current reference value Vrefi and a current feedback signal Vfbi detected from the load element 7. The power generation circuit 5 receives the control signal Vc, which is outputted by the constant power control device 3, and modulates it to provide the output power Vp to the load element 7.

Figure 2A:
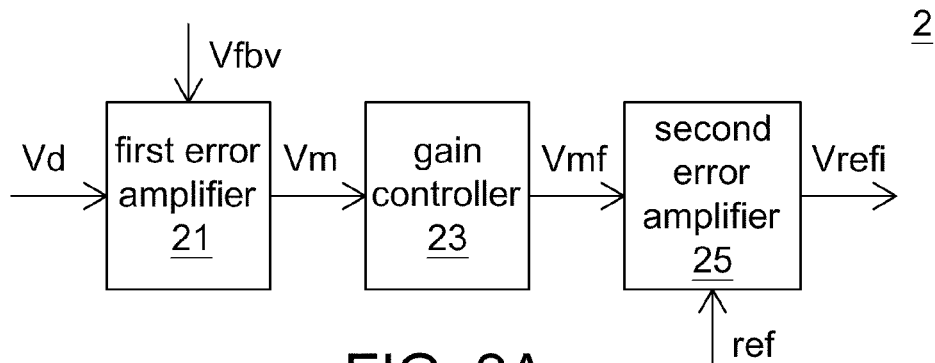
FIG. 2A is a block diagram showing the compensation and modification device in FIG. 1.

Refer to both FIG. 1 and FIGS. 2A to 2C for further description. FIG. 2A is a block diagram showing the compensation and modification device in FIG. 1. The compensation and modification device 2 includes a first error amplifier 21, a gain controller 23, and a second error amplifier 25. The first error amplifier 21 receives the voltage feedback signal Vfbv detected from the load element 7 and the voltage standard value Vd, and outputs a voltage modification value Vm. The gain controller 23 imposes a gain on the received voltage modification value Vm and generates a voltage gained value Vmf. The second error amplifier 25 generates the modified current reference value Vrefi according to the received current reference value ref and voltage gained value Vmf. The current reference value ref is obtained by transforming the expected output power voltage Vafc. However, the compensation and modification device of this embodiment is limited to the one show in FIG. 2A, but can also be implemented by an operational amplifier which performs all the functions thereof.

Figure 2B:
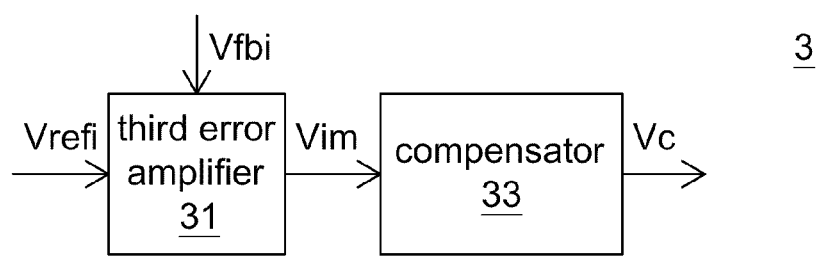
FIG. 2B is a block diagram showing the constant power control device in FIG. 1.

FIG. 2B is a block diagram showing the constant power control device in FIG. 1. The constant power control device 3 includes a third error amplifier 31 and a compensator 33. The third error amplifier 31 receives the modified current reference value Vrefi, which is outputted by the compensation and modification device 2, and the current feedback signal Vfbi, which is detected from the load element 7, and generates a current modification value Vim. The compensator 33 receives the current modification value Vim and then outputs the control signal Vc for adjusting the output power Vp.

Figure 2C:
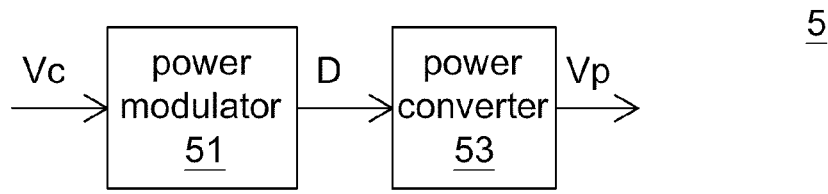
FIG. 2C is a block diagram showing the power generation circuit in FIG. 1.

FIG. 2C is a block diagram showing the power generation circuit in FIG. 1. The power generation circuit 5 includes a power modulator 51 and a power converter 53. The power modulator 51 receives the control signal Vc, which is outputted by the constant power control device 3, and modulates the control signal Vc so as to provide a modulated control signal D to the power converter 53. The power converter 53 transforms the modulated control signal D and provides the output power Vp to the load element 7. In this embodiment, the power modulator 51 can modulate the control signal Vc by way of pulse width modulation. However, the power modulator 51 can also provide its output by way of frequency modulation or phase modulation, and this embodiment is not limited thereto.

As mentioned, conventional constant power control apparatuses use multipliers or accumulators, with the result of high circuit complexity and high cost. According to the technique features disclosed in the present embodiments, the constant power control apparatus can be implemented by error amplifiers, an operational amplifier circuit, a compensation circuit, and a comparison circuit, thereby reducing the cost, simplifying the circuit complexity, and making the associated product become more competitive.

Figure 3:
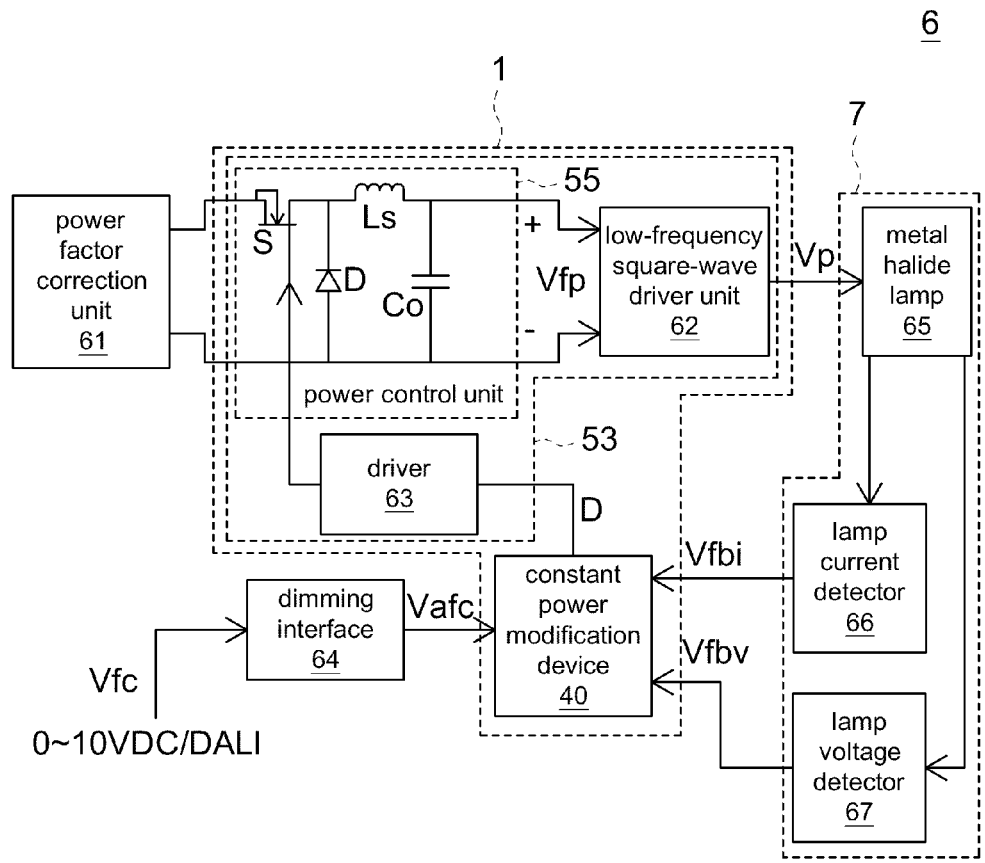
FIG. 3 is a block diagram showing a system in which the constant power control apparatus is applied to a dimmable electronic ballast thereof.

FIG. 3 is a block diagram showing a system in which the constant power control apparatus is applied to a dimmable electronic ballast thereof. The constant power control system 6 includes the constant power control apparatus 1, a power factor correction unit 61, a dimming interface 64, a metal halide lamp 65, a lamp current detector 66, and a lamp voltage detector 67. The constant power control apparatus 1 include the power converter 53 and a constant power modification device 40. That is, as for the constant power control apparatus 1, the compensation and modification device 2, the constant power control device 3, and the power modulator 51 of the power generation circuit 5 are integrated in the constant power modification device 40. The power converter 53 includes a power control unit 55, a low-frequency squarewave driver unit 62, and a driver 63. The power factor correction unit 61 allows the current of power source to follow the voltage thereof, so that the voltage and the current can tend to be in phase which increases the power factor (PF) and reduces total current harmonic distortion (THD). In this embodiment, the load element 7 includes the metal halide lamp 65, the lamp current detector 66, and the lamp voltage detector 67. The constant power control apparatus 1 are responsible for providing stable output power to the metal halide lamp 65, when the metal halide lamp 65 is unlighted, and is lighted in its transient state and steady state.

As shown in FIG. 3 the dimming interface 64 can be, for example, a digital addressable lighting interface (DALI) or a conventional analog dimming interface. The dimming interface 64 receives a voltage signal Vfc which is between 0 to 10 Volts, and transforms the voltage signal Vfc into the expected output power voltage Vafc, which can be applied in the system and used in power adjustment. The dimming interface 64 is useful in determining the output power of the electronic ballast. The constant power modification device 40 of the constant power control apparatus 1 receives the expected output power voltage Vafc, the voltage feedback signal Vfbv which the lamp voltage detector 67 detects from the metal halide lamp 65, and the current feedback signal Vfbi which the lamp current detector 66 detects from the load element 7. The constant power modification device 40 then outputs the control signal Vc for use in power adjustment. The power modulator 51 modulates the control signal Vc by way of pulse width modulation, and outputs the modulated control signal D which has a modulated pulse width.

The driver 63 receives the modulated control signal D, and drives the power control unit 55 of the power converter 53. The power control unit 55 provides direct current (DC) output power Vfp. The low-frequency square-wave driver unit 62 receives the DC output power Vfp, which is outputted by the power control unit 55, and utilizes a way of transforming a DC signal into a low-frequency square-wave signal to provide the alternating current (AC) output power Vp to the metal halide lamp 65. So, the electronic ballast can stably provide the output power.

As the features disclosed in the above embodiments, the voltage feedback signal Vfbv, which is detected by the lamp voltage detector 67, is served as the basis for adjusting the expected output power voltage Vafc, and the current feedback signal Vfbi, which is detected by the lamp current detector 66, is served as the voltage reference value for constant power control.

The relationships between each control parameters of the above-mentioned embodiments will be further described in the following. In the constant power control apparatus 1, the first error amplifier 21 of the compensation and modification device 2 can subtract the voltage standard value Vd from the voltage feedback signal Vfbv to obtain the voltage modification value Vm, i.e., Vm=Vfbv−Vd. The voltage standard value Vd can be obtained by averaging the voltage feedback signal Vfbv within whole dimming ratio range. The gain controller 23 provides a gain denoted as Kv. The gain controller can be implemented by operational amplifiers. The gain controller can, for example, impose the gain Kv on the voltage modification value Vm to obtain the voltage gained value Vmf, i.e., Vmf=Kv×Vm.

The second error amplifier 25 receives the current reference value ref, which is generated by transforming the expected output power voltage Vafc provided by the dimming interface 64, and generates the modified current reference value Vrefi by modifying the current reference value ref through the voltage gained value Vmf, i.e., Vrefi=ref−Vmf. The voltage feedback signal Vfbv, which is obtained by detecting the metal halide lamp 65, can be used to decrease the expected output power voltage Vafc when the lamp voltage of the electronic ballast is higher. Conversely, the voltage feedback signal Vfbv can also be used to increase the expected output power voltage Vafc when the lamp voltage of the electronic ballast is lower.

The third error amplifier 31 of the constant power control device 3 receives the modified current reference value Vrefi, and can subtract the current feedback signal Vfbi of the metal halide lamp 65 from the modified current reference value Vrefi to generate the current modification value Vim, i.e., Vim=Vrefi−Vfbi. The compensator 33 provides a compensation coefficient denoted as Ki. The compensator 33 can be implemented by operational amplifiers. The compensator 33 can, for example, impose the compensation coefficient Ki on the current modification value Vim to obtain the control signal Vc for use in power adjustment, i.e., Vc=Ki×Vim.

The power modulator 51 of the power generation circuit 5 receives the control signal Vc, which is outputted by the constant power control device 3. The adopted is, for example, the pulse width power modulator 51, which modulates the control signal Vc with respect to a peak voltage of a sawtooth signal, thereby obtaining the modulated control signal D, e.g., D=Vc/VM, wherein the VM denotes the peak voltage. Based on the modulated control signal D, which is pulse width modulated and outputted by the power modulator 51, the power converter 53 provides the DC output power Vfp. The low-frequency square-wave driver unit 62 converts the DC output power Vfp, in a manner of DC to low-frequency square-wave signals conversion, into the stable AC output power Vp, and provides it to the metal halide lamp 65. The compensation coefficient Ki can be determined according to experimental results of different load elements 7.

For example, the gain Kv can be a slope indicating the relationship between the AC output power Vp and the load voltage of the load element 7, and can be determined according to experimental results. However, the power converter 53 can also provide the DC output power Vfp to a DC load element directly.

Table 1 is listed below according to the above-mentioned embodiments, which shows references for each control parameters of the electronic ballast, in which the metal halide lamp 65 with rated power of 150 Watt (W) is served as the load element 7.

TABLE 1

| | |
|---|---|
| Voltage signal Vfc | 0-10 V |
| Gain Kv | 0.055 |
| Voltage standard value Vd of load element | 87 V |
| Compensation coefficient Ki | 22 |
| Peak value VM of sawtooth signal | 3.3 V |

Table 2 is listed below according to the above-mentioned embodiments, which shows estimation results obtained by taking the dimming ratio as 50% and 100% as examples. This embodiment achieves advantageous effect that the power factor is higher than 95%, THD is less than 9%, and overall efficiency is higher than 89%. As can be seen from the estimation results, given that dimming ratio is within a range between 50% and 100%, the circuit performance of the electronic ballast is complied with regulations, and the electrical and optical performances of the metal halide lamp are as desired.

TABLE 2

| | Power ratio | |
|---|---|---|
| | 100% | 50% |
| Input current (A) | 0.777 | 0.407 |
| Input power (W) | 167.0 | 88.1 |
| Power factor | 0.994 | 0.983 |
| THD (%) | 5.48 | 8.80 |
| Lamp voltage (V) | 91.36 | 81.96 |
| Lamp current (A) | 1.643 | 0.946 |
| Lamp power (W) | 150.1 | 78.63 |
| Ballast efficient (%) | 89.88 | 89.25 |

TABLE 2-continued

| | Power ratio | |
|---|---|---|
| | 100% | 50% |
| Luminous flux (Lm) | 14777 | 7265 |
| Luminous efficient (Lm/W) | 98.45 | 92.39 |

Input voltage equals to 220 Volts

Figure 4:
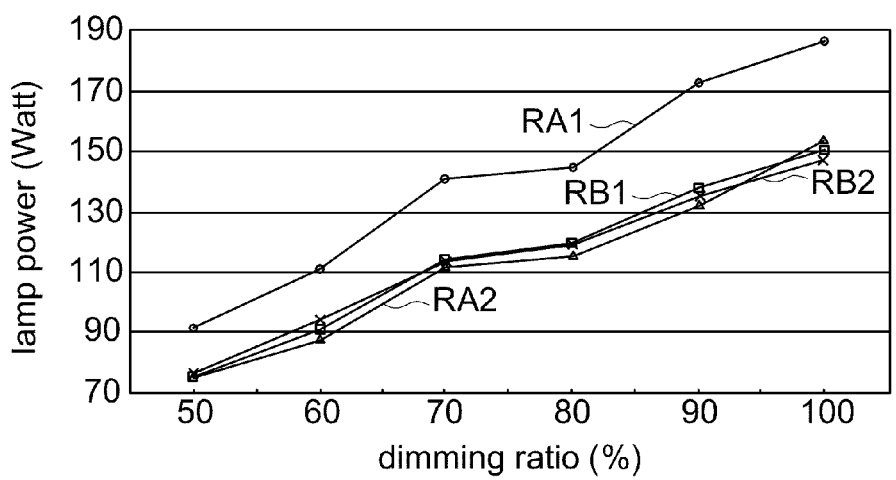
FIG. 4 is a diagram showing the variation of the output power measured at different impedances of the load element with respect to the dimming ratio, in which the metal halide lamp in FIG. 3 is served as the load element.

FIG. 4 is a diagram showing the variation of the output power measured at different impedances of the load element, in which the metal halide lamp in FIG. 3 is served as the load element, and the dimming ration is within the range between 50% and 100%. As shown in FIG. 4, RA and RB indicate equivalent impedances of different lamps. In using a conventional constant current control method, the obtained are curves RA1 and RB1 which show that the maximum power difference between the two lamps can reach 24.61%. In using the constant power control method according to the embodiments, the obtained are curves RA2 and RB2 which show that the maximum power difference between the two lamps can be reduced to 7.14%. Besides, as the dimming ration is within the range between 50% and 100%, the averaged output power differences of the two lamps are 23.12% and 3.10%, respectively, in the conventional method and the present method.

As can been obtained from the above results, the variation of the output power measured at different impedances of the load element can be reduced greatly by using the constant power control method disclosed in the embodiments. As a result, the exemplary embodiments can prevent from damaging the elements which is caused by drifting of output power, and achieve the object of providing stable output power.

The constant power control device disclosed in the embodiments has the advantages of cost reduction and circuit complexity simplification, and can be implemented with digital circuit design. As compared with a conventional constant power control apparatus which uses multipliers or accumulators, the constant power control apparatus of the embodiments can be implemented by error amplifiers, an operational amplifier circuit, a compensation circuit, and a comparison circuit, while achieves superior performances. In an exemplary embodiment, the constant power control apparatus not only can be digitalized by using software design, but also can be embodied in microprocessor chips to integrate elements, thereby reducing the volume required for the elements and increasing the space usability.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A constant power control apparatus, for providing output power to a load element, the constant power control apparatus comprising:
a compensation and modification device, for receiving an expected output power voltage and a voltage feedback signal relating to the output power, wherein the compensation and modification device transforms the expected output power voltage into a current reference value, and modifies the current reference value to generate a modified current reference value according to the voltage feedback signal;
a constant power control device, for receiving the modified current reference value and a current feedback signal relating to the output power, and generating a control signal for adjusting the output power; and
a power generation circuit, for receiving the control signal and outputting the output power;
wherein the compensation and modification device comprises:
a first error amplifier, for generating a voltage modification value according to the voltage feedback signal and a voltage standard value relating to the load element;
a gain controller, for imposing a gain on the voltage modification value and generating a voltage gained value; and
a second error amplifier, for generating the modified current reference value according to the voltage gained value and the current reference value.

2. The constant power control apparatus according to claim 1, wherein the expected output power voltage is constant or adjustable.

3. The constant power control apparatus according to claim 2, wherein if the expected output power voltage is constant, the constant power control apparatus provides the output power which is constant.

4. The constant power control apparatus according to claim 2, wherein if the expected output power voltage is adjustable, the constant power control apparatus provides the output power which is adjustable.

5. The constant power control apparatus according to claim 1, wherein:
the voltage modification value is obtained by subtracting the voltage standard value relating to the load element from the voltage feedback signal; and
the modified current reference value is obtained by subtracting the voltage gained value from the current reference value.

6. The constant power control apparatus according to claim 1, wherein the constant power control device comprises:
a third error amplifier, for generating a current modification value according to the current feedback signal and the modified current reference value; and
a compensator, for generating the control signal by compensating the current modification value.

7. The constant power control apparatus according to claim 6, wherein:
the current modification value is obtained by subtracting the current feedback signal from the modified current reference value; and
the control signal is obtained by performing gain compensation on the current modification value.

8. The constant power control apparatus according to claim 1, wherein the power generation circuit comprises:
a power modulator, for generating a modulated control signal according to the control signal; and
a power converter, for outputting the output power according to the modulated control signal.

9. The constant power control apparatus according to claim 8, wherein:
the power modulator modulates the control signal by way of frequency modulation, phase modulation, or pulse width modulation.

10. The constant power control apparatus according to claim 1, wherein the load element comprises:
a current detector, for detecting the current feedback signal; and
a voltage detector, for detecting the voltage feedback signal.

11. A constant power control method, for use in a constant power control device to provide output power to a load element, the constant power control method comprising:
- receiving an expected output power voltage and transforming the expected output power voltage into a current reference value;
- receiving a voltage feedback signal relating to the output power, and modifying the current reference value to generate a modified current reference value according to the voltage feedback signal;
- generating a control signal for adjusting the output power according to the modified current reference value and a current feedback signal relating to the output power; and
- modulating the control signal so as to output the output power;
- wherein the step of generating the modified current reference value comprises:
- generating a voltage modification value according to the voltage feedback signal and a voltage standard value relating to the load element;
- imposing a gain on the voltage modification value and generating a voltage gained value; and
- generating the modified current reference value according to the voltage gained value and the current reference value.

12. The constant power control method according to claim 11, wherein the current reference value is determined according to the expected output power voltage.

13. The constant power control method according to claim 11, wherein the output power is determined according to a level of the expected output power voltage.

14. The constant power control method according to claim 11, wherein the expected output power voltage is constant or adjustable.

15. The constant power control method according to claim 14, wherein if the expected output power voltage is constant, the output power is constant.

16. The constant power control method according to claim 14, wherein if the expected output power voltage is adjustable, the output power is adjustable.

17. The constant power control method according to claim 11, wherein:
- the voltage modification value is obtained by subtracting the voltage standard value relating to the load element from the voltage feedback signal; and
- the modified current reference value is obtained by subtracting the voltage gained value from the current reference value.

18. The constant power control method according to claim 11, wherein the step of generating the control signal comprises:
- generating a current modification value according to the current feedback signal and the modified current reference value; and
- generating the control signal by compensating the current modification value.

19. The constant power control method according to claim 18, wherein:
- the current modification value is obtained by subtracting the current feedback signal modified current reference value from the; and
- the control signal is obtained by performing gain compensation on the current modification value.

20. The constant power control method according to claim 11, wherein the step of generating the output power comprises:
- generating a modulated control signal according to the control signal; and
- outputting the output power according to the modulated control signal.

21. The constant power control method according to claim 20, wherein step of generating the output power comprises:
- modulating the control signal by way of frequency modulation, phase modulation, or pulse width modulation.

* * * * *